No. 11,813. Reissued Mar. 20, 1900.

F. C. MICHAELIS.

APPARATUS FOR SEPARATING AND CLEANING PULP FOR PAPER MAKING.

(Application filed Feb. 21, 1900.)

3 Sheets—Sheet 1.

Witnesses:
John A. Paulson
E. E. Nielson

Inventor:
Fred C. Michaelis
by Schreiter & Mathews, his Att'ys.

No. 11,813. Reissued Mar. 20, 1900.

F. C. MICHAELIS.

APPARATUS FOR SEPARATING AND CLEANING PULP FOR PAPER MAKING.

(Application filed Feb. 21, 1900.)

3 Sheets—Sheet 2.

Witnesses:
John A. Paulson
C. C. Nielson

Inventor:
Fred C. Michaelis,
by Schreiter & Mathews his Att'ys.

No. 11,813. Reissued Mar. 20, 1900.

F. C. MICHAELIS.

APPARATUS FOR SEPARATING AND CLEANING PULP FOR PAPER MAKING.

(Application filed Feb. 21, 1900.)

3 Sheets—Sheet 3.

Witnesses:
John A. Paulson
C. C. Nelson.

Inventor:
Fred C. Michaelis,
by Schreiter & Mathews, his Att'ys.

UNITED STATES PATENT OFFICE.

FRED C. MICHAELIS, OF BALLSTON, NEW YORK.

APPARATUS FOR SEPARATING AND CLEANING PULP FOR PAPER-MAKING.

SPECIFICATION forming part of Reissued Letters Patent No. 11,813, dated March 20, 1900.

Original No. 641,131, dated January 9, 1900. Application for reissue filed February 21, 1900. Serial No. 6,132.

*To all whom it may concern:*

Be it known that I, FRED C. MICHAELIS, of Ballston Spa, county of Saratoga, and State of New York, have invented certain new and useful Improvements in Apparatus for Separating and Cleaning Pulp for Paper-Making, of which the following is a full, clear, and exact specification, reference being had to the accompanying drawings, wherein—

Figure 1:
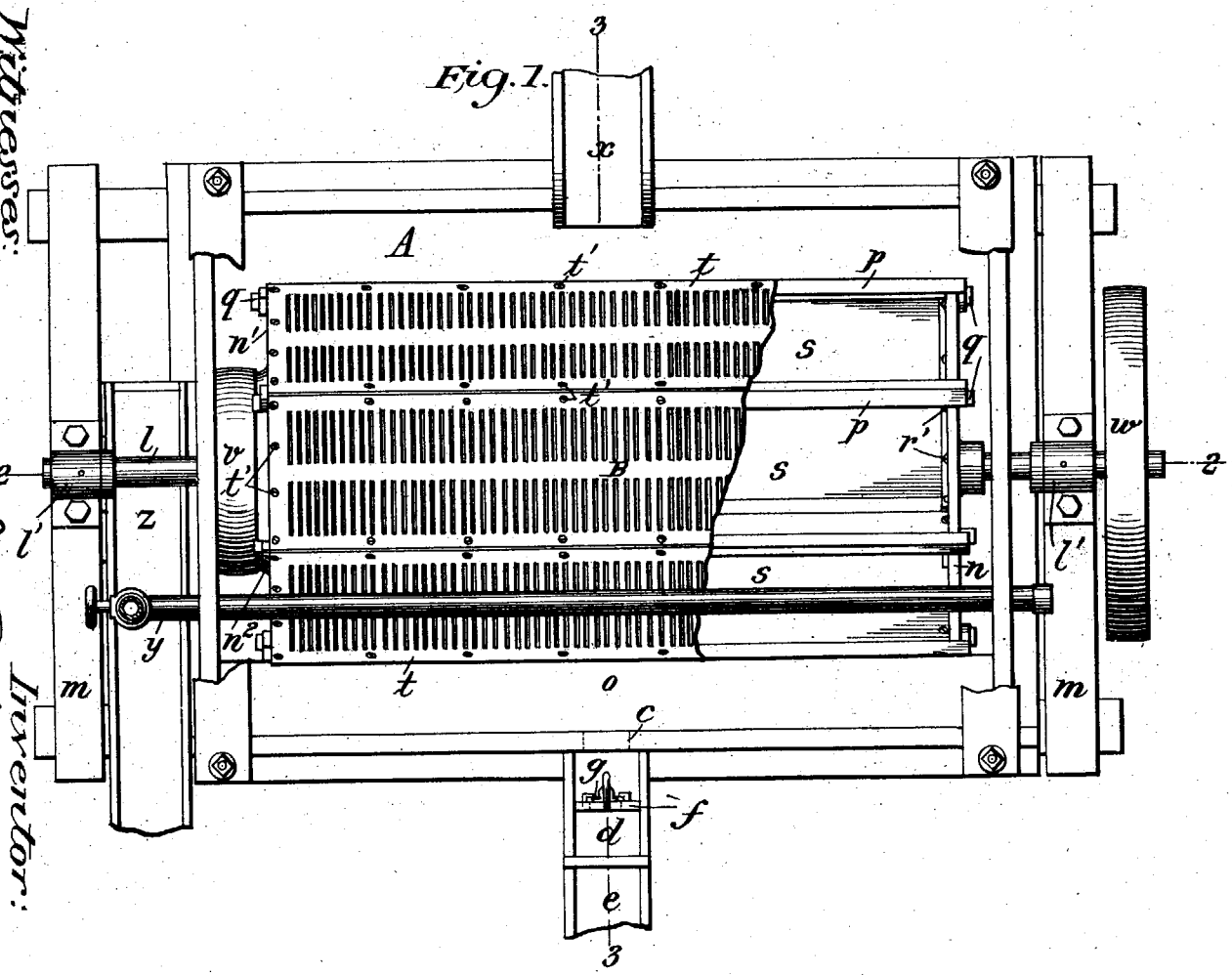
Figure 2:
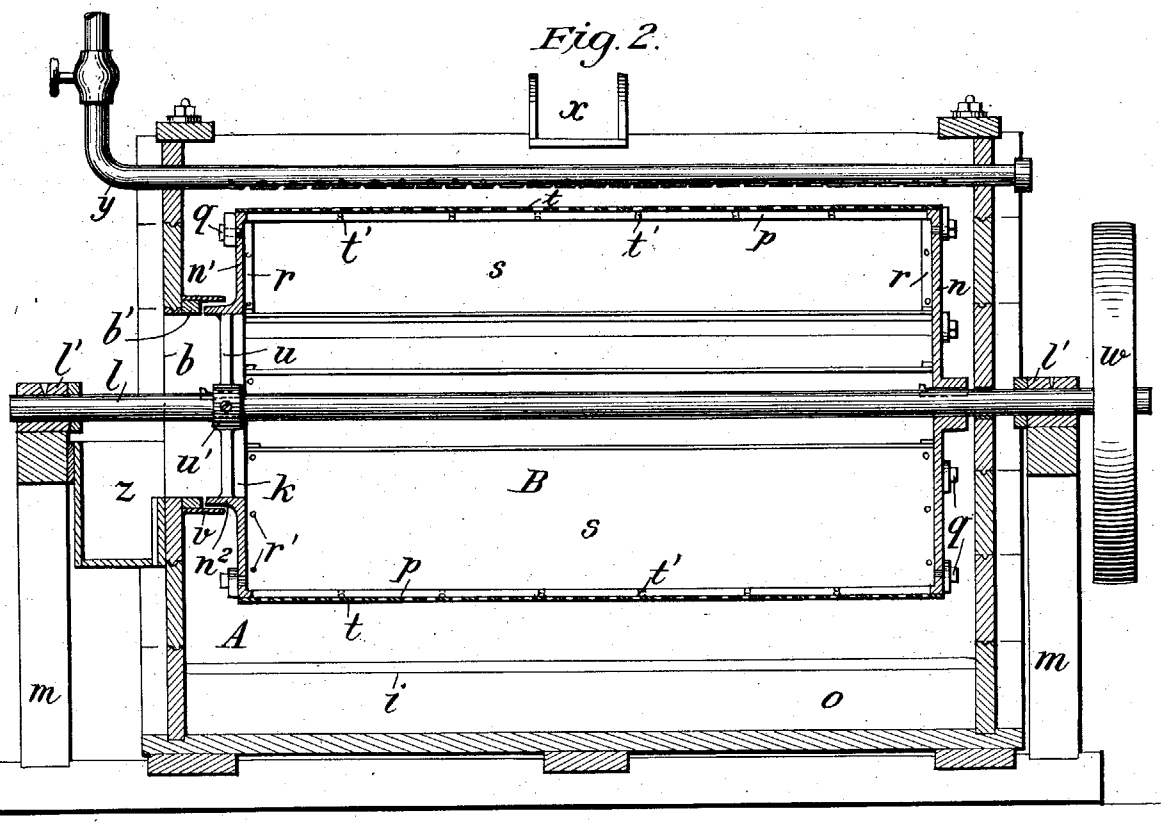
Figure 3:
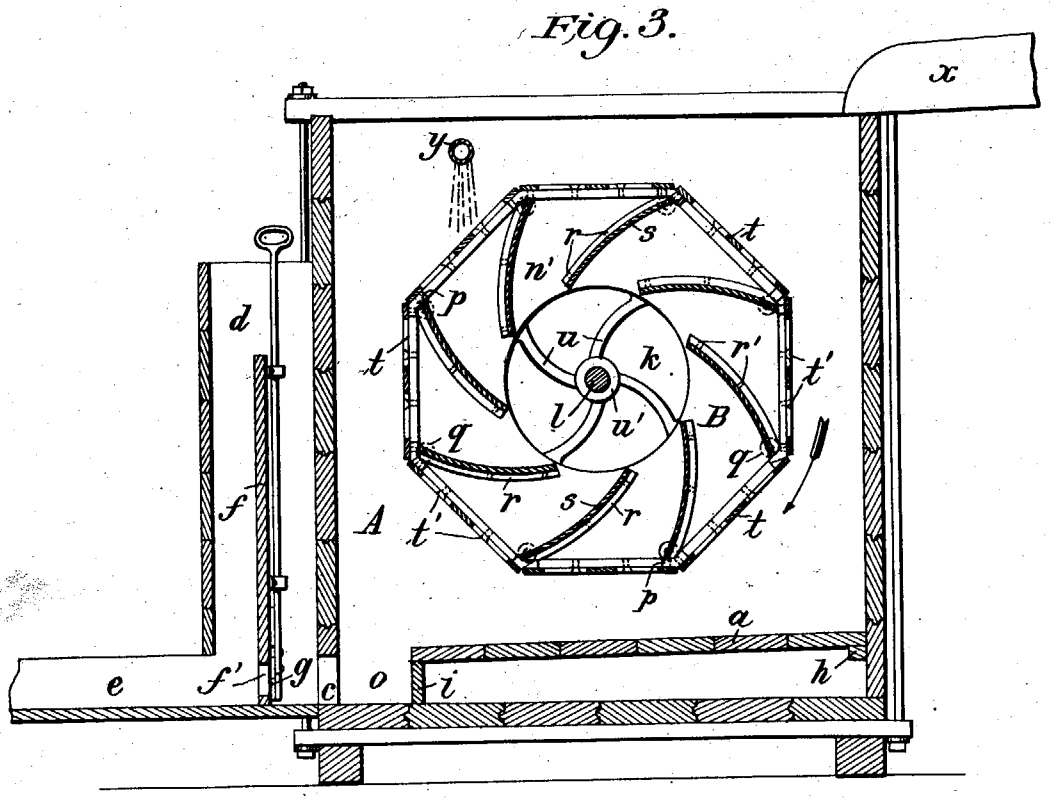

Figure 1 is a plan view of my improved apparatus; Fig. 2, a longitudinal sectional view on lines 2 2 indicated in Fig. 1, and Fig. 3 a cross-sectional view on lines 3 3 indicated in Fig. 1.

Similar letters of reference indicate corresponding parts in all views of the drawings.

My invention consists of the hereinafter-described improvements in construction of apparatus for separating and cleaning pulp for paper-making, whereby the apparatus is rendered more efficient both in quantity and in quality of the work performed and the costs of constructing and of operating such an apparatus greatly reduced.

The vat A of the apparatus is made, preferably, of timber in any suitable shape and open on top. A part of its bottom is raised, the false bottom $a$ being supported on strips $h$ and partition $i$, respectively. In this manner a trough $o$ is formed running alongside of one of the longitudinal walls of the vat. Approximately in the center of this longitudinal wall and on a level with the bottom of the trough $o$ is an aperture $c$, connecting trough $o$ with stand-pipe $d$ and culvert $e$. Stand-pipe $d$ is divided by partition $f$ in two parts of approximately-equal areas. This partition-wall $f$ does not extend to the upper edge of pipe $d$ to allow the liquid flowing from the vat A to overflow the upper edge of the partition $f$ and to pass into the second compartment of the stand-pipe $d$, communicating with the culvert $e$. There is an aperture $f'$ provided in the partition $f$. This aperture, located oppositely to the aperture $c$, is normally closed by slide-valve $g$, which may be withdrawn for draining the vat A of its contents.

On each end of vat A a standard $m$ is set, supporting bearing-blocks $l'$, and in these is mounted shaft $l$, running longitudinally through vat A. On this shaft is mounted within the vat A the polygonal screening-cylinder B. This screening-cylinder B consists of two (preferably octagonal) end plates $n$ and $n'$, joined together by bars $p$, secured to the end plates $n$ and $n'$ by screws $q$. Both end plates $n$ and $n'$ are provided with flanges $r$, and to these flanges are secured plates $s$ by bolts $r'$. These plates extend throughout the whole length of the cylinder. They are slightly curved, running from the corners of the cylinder to a point about midway between its center and periphery.

The body of the polygonal cylinder B is composed of screens $t$, secured to the end plates $n$ and $n'$ and ribs $p$ by screws $t'$, as shown in the drawings, or these screens may be slid in grooves provided for that purpose. Plate $n'$ is provided with aperture $k$, surrounded by flange $n^2$, and is supported by spokes $u$ on hub $u'$.

On one end of vat A, approximately in center of its front wall, is a flanged opening $b$, the flange $b'$ projecting into the interior of the vat. This aperture corresponds in position, size, and shape with aperture $k$ of the polygonal cylinder B. Flange $n^2$ reaches closely to flange $b'$, and the joint between the two flanges is covered by ring $v$ of some durable and flexible material, preferably coarse felt.

Belt-pulley $w$ is keyed on the rearwardly-projecting end of shaft $l$. A perforated water-pipe $y$ is run longitudinally through the vat in such position that the water escaping therefrom drips upon the polygonal cylinder B, striking the screen-plates $t$ while the same are in sloping position.

A funnel or charging-spout $x$, connecting the apparatus with the stuff-chest or with the digester-tank, is placed in inclined position, so as to discharge in the interior of the vat A. Trough $z$ is set below aperture $b$ and connects with it. This trough is so situated that the strained pulp discharged from the cylinder B flows into it and is conveyed by it to a receptacle for further treatment. The stand-pipe $d$ serves also as means to prevent overflow of the material within the vat A in case a greater quantity of material is accidentally discharged into the vat, as it sometimes happens. In such a case the surplus escapes over partition *f* and through culvert *e* into the next vat or into a receptacle connected therewith.

The apparatus works as follows: The liquid containing the digested pulp, slivers, and knots flows from the digester through spout *x* into the vat A. Belt-pulley *w*, driven by a belt, causes the shaft *l* and the polygonal cylinder B to rotate. The corners of the polygonal cylinder B being farther from the center of shaft *d* than its sides, the rotation of the cylinder B stirs up the liquid material filled in the vat A and keeps it in a constantly-moving state. While the cylinder is thus rotated each of the screen-plates *t* comes successively in position to strike or abut against the liquid material filled in the vat, and as there is at the same time a current of draft-air produced inside of the cylinder the liquid and fine particles of pulp are driven through the screens into the interior of the cylinder and are discharged through aperture *k* into trough *z*, conveying the strained and separated pulp to a receptacle. While this process is going on, the water dripping from the perforated water-pipe *y* upon that side of the cylinder B rising from the liquid in the vat washes off all slivers and particles of material attached to the screens, thus preventing clogging of the screens. The more coarse pulp and the undigested parts of the material accumulate in the trough *o*. In consequence of the peculiar arrangement of the bottom of the vat A the residue in trough *o* is not disturbed by rotating the cylinder B and is drawn off from time to time by opening slide *g*. The liquid carrying the coarser particles of pulp overflows partition *f* into the second compartment of the stand-pipe *d* and is conveyed through culvert *e* to another vat, where it may be drained and prepared for use as material for making wrapping-paper.

The advantages of my improved construction of the apparatus reside, first, in making the rotary cylinder polygonal and the plates *s* concave and setting them in position described, whereby the friction and resistance of the pulp material to the motion of the apparatus are greatly reduced, almost entirely obviated, and the efficiency of the apparatus greatly increased, and, second, in combining with the vat of the overflow stand-pipe *d*, whereby at the same time while the apparatus is in action the coarser particles of pulp which cannot pass through the screens are separated from the heavier impurities and from the not digested material accumulating in trough *o*, from where it may be withdrawn.

The greater efficiency of the apparatus is explained as follows: It will be observed that as the cylinder B rotates each side thereof forms, together with the two adjoining plates *s*, a pocket, which is absolutely empty at the time when that particular section of the cylinder enters into the pulp material in the vat. The liquid striving to restore its equilibrium presses through the perforated body of the cylinder, and this pressure gradually increases as each section descends toward the lowest point. From this point each section again commences to rise and the strained liquid within the cylinder gradually recedes from the side of the cylinder, thereby creating an empty space immediately adjoining the perforated body of the screening-cylinder. The result of this is the same as explained above. The liquid outside of the cylinder presses upon its perforated side and drives the fine particles of pulp through the perforations. The concaved form of plates facilitates the receding of the liquid from the sides of the cylinder and causes it to move toward the center of the straining-cylinder. In this manner these plates *s* neutralize the effect of centrifugal force upon the liquid and facilitate its discharge from the straining-cylinder. These peculiar advantages of my improved construction render it unnecessary to revolve the cylinder B with such great speed as the round cylinders of such straining apparatus must be revolved, and owing to the greater force with which the pulp material is driven through the screens a much greater quantity of the pulp material is strained by using my improved apparatus than can be done in any other apparatus heretofore known.

A further advantage of the several improvements in the construction of my apparatus rests in that it requires much less power and much less time for performing the same amount of work as any heretofore-known apparatus of the same size.

The apparatus for separating and cleaning pulp heretofore used are provided with mechanism for shaking the screens, because the round cylinder-screens operate very slowly and become easily clogged, or they must be driven at a very great speed and require great power to operate them. They are also rapidly ruined by wear. My improved apparatus does not require any shaking mechanism and runs without noise, easily, and smoothly. The result of that is that the apparatus is not perceptibly effected by wear, and in making my experiments for the construction of the hereinbefore-described apparatus I used discarded screens which no longer could be used in the pulp-straining apparatuses on account of their apertures being enlarged by wear, and I found that these discarded screens can still be used to good advantage in my apparatus and perform the work satisfactorily. This shows that in my apparatus screens can be used having considerably-wider apertures than those required in apparatuses heretofore known and that they last very much longer. The diaphragm-screens which are mostly used in such pulp-separating apparatuses are very expensive and by extending the period of their utility great saving is effected in the manufacture of paper.

I claim as my invention and desire to secure by Letters Patent—

1. A screening-cylinder for separating and cleaning of pulp for paper-making, consisting of a shaft, polygonal end plates mounted on the shaft, curved plates secured to the end plates and extending inwardly from the corners thereof to a point approximately midway between the center and the peripheries of the end plates and of screens secured to the end plates and composing together with the end plates the body of the cylinder.

2. A cylinder for separating and cleaning of pulp for paper-making, consisting of a shaft, polygonal end plates mounted on the shaft, one of the end plates being provided with a flanged aperture located approximately in its center, of curved plates secured to the end plates and extending inwardly from the corners thereof to a point about midway between their centers and their peripheries, and of flat screens secured to the peripheries of the end plates and forming the body of the cylinder.

3. A screening-cylinder for separating and cleaning of pulp for paper-making, consisting of a shaft, polygonal end plates mounted on the shaft and having correspondingly-curved flanges extending from the corners of the end plates to a point about midway between their centers and their peripheries, curved plates secured to the flanges, ribs secured to the corners of the end plates and extending from one end plate to the other, and flat screens secured to the end plates and to the ribs.

4. The combination with a screening-cylinder consisting of a shaft, polygonal end plates mounted on the shaft and of screens secured to the end plates and forming together with the end plates the body of the cylinder, of curved end plates set in the cylinder and extending inwardly from the corners of the end plates to a point approximately midway between their centers and their peripheries.

5. An apparatus for separating and cleaning of pulp for paper-making, consisting of a vat, having an aperture approximately in center of one side thereof, suitable standards, one on each end of the vat, a shaft passing longitudinally through the vat and mounted in bearings supported on the standards, a screening-cylinder mounted on the shaft within the vat and consisting of polygonal end plates secured to the shaft and provided with corresponding flanges extending between their centers and peripheries, curved plates secured to the flanges and extending from one end plate to the other, and of flat screens secured to the peripheries of the end plates, the screening-cylinder having a flanged aperture in its end plate, opposite the aperture in the vat, an inlet and an outlet trough conveying the pulp material into and from the apparatus, an outlet for discharge of the residue, and means for rotating the shaft.

6. An apparatus for separating and cleaning pulp for paper-making, consisting of a vat, having an aperture approximately in center of one side thereof, suitable standards, one on each end of the vat, a shaft passing through the vat and mounted in bearings supported on the standards; a polygonal screening-cylinder secured to the shaft within the vat, and having an aperture in its end plate, opposite the aperture in the vat, curved plates set in the cylinder from each corner thereof to a point about midway between its center and periphery, a collar, covering the joint between the edges of the aperture of the cylinder and the aperture of the vat, a perforated water-pipe set in the vat above the screening-cylinder to one side of the center thereof, an inlet and an outlet trough conveying the pulp material into and from the apparatus, an outlet for discharge of the residue, and means for rotating the shaft.

7. An apparatus for separating and cleaning pulp for paper-making, consisting of a vat, having a discharge-aperture approximately in center of one end side and another aperture in the longitudinal wall thereof, a trough provided in the bottom of the vat and alongside of its perforated longitudinal wall, a stand-pipe adjoining the vat and communicating therewith through the aperture, a partition-wall set in the stand-pipe extending from a point below its upper edge and down to its bottom, and provided with an aperture opposite the aperture in the wall of the vat, a slide-valve closing the aperture in the partition-wall, a culvert communicating with the stand-pipe, a trough connecting with the discharge-aperture of the vat, a straining-cylinder rotatably mounted in the vat, and having an aperture coinciding with the discharge-aperture of the vat, and means for rotating the cylinder in the vat.

In witness that I claim the improvements described in the foregoing specification I have signed my name in the presence of two subscribing witnesses.

FRED C. MICHAELIS.

Witnesses:
THOMAS W. BROWN,
JOHN W. REYNOLDS.